US009465864B2

(12) United States Patent
Hu et al.

(10) Patent No.: US 9,465,864 B2
(45) Date of Patent: Oct. 11, 2016

(54) TRAINING A SEARCH QUERY INTENT CLASSIFIER USING WIKI ARTICLE TITLES AND A SEARCH CLICK LOG

(75) Inventors: Jian Hu, Beijing (CN); Hao Zheng, Beijing (CN)

(73) Assignee: Excalibur IP, LLC, Sunnyvale, CA (US)

(*) Notice: Subject to any disclaimer, the term of this patent is extended or adjusted under 35 U.S.C. 154(b) by 225 days.

(21) Appl. No.: 13/384,589

(22) PCT Filed: Sep. 29, 2010

(86) PCT No.: PCT/CN2010/001518
§ 371 (c)(1),
(2), (4) Date: Jan. 17, 2012

(87) PCT Pub. No.: WO2012/040872
PCT Pub. Date: Apr. 5, 2012

(65) Prior Publication Data
US 2012/0226641 A1    Sep. 6, 2012

(51) Int. Cl.
*G06F 15/18* (2006.01)
*G06F 17/30* (2006.01)
*G06K 9/62* (2006.01)
*G06N 5/02* (2006.01)
*G06N 99/00* (2010.01)

(52) U.S. Cl.
CPC ....... *G06F 17/30705* (2013.01); *G06K 9/6256* (2013.01); *G06K 9/6269* (2013.01); *G06N 5/025* (2013.01); *G06N 99/005* (2013.01)

(58) Field of Classification Search
USPC .......................................................... 706/12
See application file for complete search history.

(56) References Cited

U.S. PATENT DOCUMENTS

| 7,860,886 B2 * | 12/2010 | Loftesness | 707/771 |
| 2006/0064411 A1 * | 3/2006 | Gross et al. | 707/3 |
| 2008/0010249 A1 * | 1/2008 | Curtis | G06F 17/30705 |
| 2008/0082518 A1 * | 4/2008 | Loftesness | G06F 17/30979 |

(Continued)

FOREIGN PATENT DOCUMENTS

| CN | 101719129 A | 6/2010 |
| WO | 2012/040872 A1 | 4/2012 |

OTHER PUBLICATIONS

Understanding User's Query Intent with Wikipedia Jian Hu', Gang Wang', Fred Lochovsky2, Jian-Tao Sun', Zheng Chen'.*

(Continued)

*Primary Examiner* — Kakali Chaki
*Assistant Examiner* — Ababacar Seck
(74) *Attorney, Agent, or Firm* — Brinks Gilson & Lione

(57) ABSTRACT

Techniques are described herein for training a search query intent classifier using wiki article titles and a search click log. Titles of wiki articles that correspond to links that are associated with a specified wiki article and/or titles of wiki articles that are included in a category that includes the specified wiki article are extracted and included with the title of the specified wiki article in an initial set. Each title in the initial set is correlated with respective clicked URI(s) using a search click log. The initial set is expanded to include search terms that are correlated to the clicked URIs based on the search click log to provide an expanded set. The search query intent classifier is trained to classify search queries with respect to a query intent that is associated with the title of the specified wiki article based on the expanded set.

21 Claims, 9 Drawing Sheets

(56) References Cited

U.S. PATENT DOCUMENTS

2009/0132601 A1    5/2009  Cundiff et al.
2009/0327260 A1\*  12/2009  Li ..................... G06F 17/30672

OTHER PUBLICATIONS

Query Expansion by Mining User Logs Hang Cui, Ji-Rong Wen, Jian-Yun Nie, and Wei-Ying Ma, Member, IEEE.\*
Understanding Users Query Intent with Wikipedia Jian Hu', Gang Wang', Fred Lochovsky2, Jian-Tao Sun', Zheng Chen'.\*
Understanding User's Query Intent with Wikipedia—2009 Jian Hu, Gang Wang, Fred Lochovsky, Jian-Tao Sun, Zheng Chen.\*
Understanding Users Query Intent with Wikipedia—2009 Jian Hu, Gang Wang, Fred Lochovsky, Jian-Tao Sun, Zheng Chen.\*
Query Expansion by Mining User Logs—2003 Hang Cui, Ji-Rong Wen, Jian-Yun Nie, and Wei-Ying Ma, Member, IEEE.\*
Catching the Drift:Learning Broad Matches from Clickthrough Data—2009 Sonal Gupta, Miikhail Bilenko, Matthew Richardson.\*
Hu, et al., "Enhancing Text Clustering by Leveraging Wikipedia Semantics", ACM, SIGIR'08, Jul. 20-24, 2008, pp. 179-186.
Hu, et al., "Understanding User's Query Intent with Wikipedia", ACM, WWW 2009, Apr. 20-24, 2009, pp. 471-480.
Beitzel, et al., "Improving Automatic Query Classification via Semi-supervised Learning", ISBN ~ ISSN:1550-4786, 0-7695-2278-5 Proceedings of the Fifth IEEE International Conference on Data Mining, 2005, pp. 42-49.
Robertson, et al., "Simple BM25 extension to multiple weighted fields", Proceedings of the thirteenth ACM international conference on Information and knowledge management, ISBN:1-58113-874-1, 2004, pp. 42-49.
Broder, et al., "Robust classification of rare queries using web knowledge", SIGIR'07, Proceedings of the 30th annual international ACM SIGIR conference on Research and development in information retrieval, ISBN:978-1-59593-597-7, Jul. 23-27, 2007, pp. 231-238.
Toral, et al., "A proposal to automatically build and maintain gazetteers for Named Entity Recognition by using Wikipedia", In Proc. of the 11th Conference of the European Chapter of the Association for Computational Linguistics, 2006, 6 pages.
Shen, et al., "Building Bridges for Web Query Classification", SIGIR'06, ISBN:1-59593-369-7 Proceedings of the 29th annual international ACM SIGIR conference on Research and development in information retrieval, Aug. 6-11, 2006, pp. 131-138.
Shen, et al., "Q2C@UST: our winning solution to query classification in KDDCUP 2005", ACM, SIGKDD Explorations, vol. 7, Issue 2 Dec. 2005, pp. 100-110.
Gutwin, et al., "Domain-Specific Keyphrase Extraction", Proceedings of the Sixteenth International Joint Conference on Artificial Intelligence ISBN:1-55860-613-0, 1999, 4 pages.
Schonhofen, "Identifying Document Topics Using the Wikipedia Category Network", Proceedings of the 2006 IEEE/WIC/ACM International Conference on Web Intelligence, ISBN:0-7695-2747-7, 2006, pp. 456-462.
Vogel, et al., "Classifying search engine queries using the web as background knowledge", ACM SIGKDD Explorations Newsletter vol. 7, Issue 2, Dec. 2005, pp. 117-122.
Ponzetto, et al., "Deriving a Large Scale Taxonomy from Wikipedia", In Proc. of the Twenty-Second National Conference on Artificial Intelligence (AAAI-2007), 2007, 6 pages.
Cucerzan, "Large-Scale Named Entity Disambiguation Based on Wikipedia Data", In Proc. of the 2007 Conference on Empirical Methods in Natural Language Processing (EMNLP-07), Jun. 2007, pp. 708-716.
Dai, et al., "Detecting Online Commercial Intention (OCI) ACM", Proceedings of the 15th international conference on World Wide Web ISBN:1-59593-323-9, 2006, pp. 829-837.
Li, "Learning Query Intent from Regularized Click Graphs", Annual ACM Conference on Research and Development in Information Retrieval, ISBN:978-1-60558-164-4, Jul. 20-24, 2008, pp. 339-346.
Shen, et al., "Personal name classification in web queries", ACM, Web Search and Web Data Mining, ISBN:978-1-59593-927-9, Feb. 11-12, 2008, pp. 149-158.
"F1 score", From Wikipedia, the free encyclopedia, retrieved from <http://en.wikipedia.org/wiki/F1_score> on Jan. 12, 2012, 2 pages.
Witten, et al., "KEA: Practical Automatic Keyphrase Extraction", ACM, International Conference on Digital Libraries ISBN:1-58113-145-3, 1999, 9 pages.
Jansen, et al., "Real life, real users, and real needs: a study and analysis of user queries on the web", Information Processing and Management: an International Journal, ISSN:0306-4573, vol. 36, Issue 2, Jan. 2000, 16 pages.
Zaragoza, et al., "Ranking very many typed entities on wikipedia", ACM, Conference on Information and Knowledge Management, ISBN:978-1-59593-803-9, 2007, pp. 1015-1018.
Vallet, et al., "Inferring the most important types of a query: a semantic approach", SIGIR'08, Annual ACM Conference on Research and Development in Information Retrieval, ISBN:978-1-60558-164-4, Jul. 20-24, 2008, pp. 857-858.
Lee, "Combining multiple evidence from different properties of weighting schemes", Annual ACM Conference on Research and Development in Information Retrieval, ISBN:0-89791-714-6, 1995, 16 pages.
Gabrilovich, et al., "Computing semantic relatedness using Wikipedia based explicit semantic analysis", In Proc. of the 20th International Joint Conference on Artificial Intelligence (IJCAI-07), 2007, 6 pages.
Ruiz-Casado, et al., "Automatic extraction of semantic relationships for WordNet by means of pattern learning from Wikipedia", In Proc of the 11th International Conference on Applications of Natural Language to Information Systems (NLDB2006), 2006, 13 pages.
Strube, et al., "WikiRelate! Computing Semantic Relatedness Using Wikipedia", In Proc. of the Twenty-First National Conference on Artificial Intelligence (AAAI-2006), 2006, 6 pages.
Wang, et al., "Improving Text Classification by Using Encyclopedia Knowledge, ICDM", Proceedings of the 2007 Seventh IEEE International Conference on Data Mining, ISBN ~ ISSN:1550-4786, 0-7695-3018-4 IEEE, 2007, pp. 332-341.
Liu, et al., "On the limited memory BFGS method for large scale optimization", vol. 45, Issue 3, Mathematical Programming: Series A and B, ISSN:0025-5610, 1989, pp. 503-528.
Hotho, et al., "Wordnet improves Text Document Clustering", In Proceedings of the Semantic Web Workshop at SIGIR'03, 2003, 9 pages.
Gabrilovich, et al., "Feature Generation for Text Categorization Using World Knowledge", In Proceedings of the Nineteenth International Joint Conference for Artificial Intelligence, 2005, pp. 1048-1053.
Gabrilovich, et al., "Overcoming the Brittleness Bottleneck using Wikipedia: Enhancing Text Categorization with Encyclopedic Knowledge", In Proceedings of the Twenty-First National Conference on Artificial Intelligence, 2006, pp. 1301-1306.
Milne, et al., "Mining Domain-Specific Thesauri from Wikipedia: A Case Study", Proceedings of the 2006 IEEE/WIC/ACM International Conference on Web Intelligence, ISBN:0-7695-2747-7, IEEE Computer Society, 2006, pp. 442-448.
Bunescu, et al., "Using encyclopedic knowledge for named entity disambiguation", In Proceedings of the 11th Conference of the European Chapter of the Association for Computational Linguistics (EACL-06), Apr. 2006, pp. 9-16.
Porter, "An algorithm for suffix stripping", Computer Laboratory, Program, 14(3), 1980, pp. 313-316.
Agirre, et al., "A Proposal for Word Sense Disambiguation using Conceptual Distance", In the Proceedings of the First International Conference on Recent Advances in NLP, 1995, 7 pages.
Lewis, "Reuters-21578 text categorization test collection", Test Collections, May 14, 2004, 14 pages Webpage Available at: <http://www.daviddlewis.com/resources/testcollections/reuters21578/>.
Hersh, et al., "OHSUMED: an interactive retrieval evaluation and new large test collection for research", Proceedings of the 17th annual international ACM SIGIR conference on Research and development in information retrieva, ACM, ISBN:0-387-19889-X, Springer-Verlag, 1994, pp. 192-201.

(56) References Cited

OTHER PUBLICATIONS

Lang, "NewsWeeder: Learning to Filter Netnews", In ICML'95, 1995, pp. 331-339.
Joachims, "Text Categorization with Suport Vector Machines: Learning with Many Relevant Features", Lecture Notes in Computer Science; vol. 1398, Springer-Verlag, ISBN:3-540-64417-2, 1998, pp. 137-142.
Sebastiani, "Machine learning in automated text categorization", vol. 34, Issue 1, ACM Computing Surveys (CSUR), Mar. 2002, pp. 1-47.
Yang, et al., "A re-examination of text categorization methods", ACM, Proceedings of the 22nd annual international ACM SIGIR conference on Research and development in information retrieval , ISBN:1-58113-096-1, 1999, pp. 42-49.
de Buenaga Rodriguez, et al., "Using WordNet to complement training information in text categorization", In Recent Advances in Natural Language Processing II, vol. 189, 2000, 18 pages.
Dave, et al., "Mining the peanut gallery: opinion extraction and semantic classification of product reviews", Proceedings of the 12th international conference on World Wide Web, ISBN:1-58113-680-3, May 20-24, 2003, pp. 519-528.
Miller, "WordNet: a lexical database for English,", Communications of the ACM, vol. 38, Issue 11, ISSN:0001-0782, Nov. 1995, pp. 39-41.
"Open Directory Project", dmoz, Netscape, Retrieved on Sep. 20, 2010, Webpage Available at: <http://dmoz.org>, 1 page.
Steinbach, et al., "A comparison of document clustering techniques", KDD Workshop on Text Mining, 2000, 20 pages.
"Precision and recall", From Wikipedia, the free encyclopedia, retrieved from <http://en.wikipedia.org/wiki/Precision_and_recall> on Jan. 12, 2012, 6 pages.
"Wikipedia:About", Wikipedia, the free encyclopedia, Retrieved on Sep. 20, 2010, 13 pages, Webpage Available at: <http://en.wikipedia.org/wiki/Wikipedia:About>.
Urena Loez, et al., "Integrating linguistic resources in tc through wsd.", Computers and the Humanities, 35(2), 2001, pp. 215-230.
Wong, et al., "Chinese word segmentation based on maximum matching and word binding force", Proceedings of the 16th conference on Computational linguistics—vol. 1, International Conference on Computational Linguistics, 1996, pp. 200-203.
International Search Report and Written Opinion received for International Application Serial No. PCT/CN2010/001518 dated Jun. 30, 2011, 11 pages.

* cited by examiner

TRAINING A SEARCH QUERY INTENT CLASSIFIER USING WIKI ARTICLE TITLES AND A SEARCH CLICK LOG

BACKGROUND OF THE INVENTION

1. Field of the Invention

The present invention relates to techniques for training a search query intent classifier.

2. Background

A search engine is a type of program that may be hosted and executed by a server. A server may execute a search engine to enable users to search for documents in a networked computer system based on search queries that are provided by the users. For instance, the server may match search terms (e.g., keywords and/or key phrases) that are included in a user's search query to metadata associated with documents that are stored in (or otherwise accessible to) the networked computer system. Documents that are retrieved in response to the search query are provided to the user as a search result. The documents are often ranked based on how closely their metadata matches the search terms. For example, the documents may be listed in the search result in an order that corresponds to the rankings of the respective documents. The document having the highest ranking is usually listed first in the search result. In some instances, contextual advertisements are provided in conjunction with the search result based on the search terms.

It may be desirable to classify a search query with respect to query intent in order to provide a more relevant search result and/or more relevant contextual advertisements to a user who provides the search query. Training data is often used to train classifiers that are configured to classify search queries with respect to query intent. However, the multitude of potential search queries poses challenges for collecting training data that adequately represents a specific query intent domain while sufficiently covering the various aspects of the query intent domain. Machine learning techniques that consume substantial resources (e.g., money, time, etc.) and involve substantial human effort are often employed in an effort to enable prediction of new data that corresponds to the query intent domain. The human-selected training data upon which such techniques are based may be biased and/or limited in scope due to the biases and/or knowledge of the persons who select the data.

Thus, systems, methods, and computer program products are needed that address one or more of the aforementioned shortcomings of conventional classifier training techniques.

BRIEF SUMMARY OF THE INVENTION

Various approaches are described herein for, among other things, training a search query intent classifier using wiki article titles and a search click log. A wiki is a site (e.g., a Web site) that provides a platform for the creation and editing of interlinked pages (e.g., Web pages) via a client (e.g., a Web crawler, a Web browser, a non-Web-enabled client, etc.). Each interlinked page of a wiki is referred to as a wiki article. Each wiki article includes a title and a body. The title identifies the subject matter of the wiki article, and the body provides information (e.g., text, images, video, etc.) regarding the subject matter.

Wiki articles are associated with links (e.g., hyperlinks). For example, a wiki article may be associated with an article link, an in-link, a category link, a redirection link, and/or a disambiguation link. An article link is a link from the wiki article to another wiki article. An in-link is a link to the wiki article from another wiki article. A category link is a link to a category that includes the wiki article. For instance, categories of wiki articles may be organized hierarchically into an ontology. A redirection link is a link to a wiki article that has a title that is deemed to be relevant to the user's search query when no wiki article has a title that matches the user's search query exactly. A disambiguation link is a link to one of multiple wiki articles to which the user's search query is deemed to pertain.

Documents that are retrieved in response to a user's search query are referred to as a search result. Each of the documents has a respective uniform resource identifier (URI), such as a uniform resource locator (URL) or a uniform resource name (URN), which may be selected (e.g., clicked) by the user to cause the document to be displayed to the user. A search click log is a record of search queries that are provided by users and the documents that are selected by the users from the search results that are retrieved in response to those search queries. Accordingly, a search click log may be used to correlate search terms that are included in the users' search queries to the clicked uniform resource identifiers.

An example method is described for training a search query intent classifier. In accordance with this example method, first titles of respective first wiki articles are extracted to provide an initial key term set that includes the first titles and a second title that is associated with a designated query intent. The first wiki articles correspond to respective links that are associated with a second wiki article that has the second title. Each of the first titles and the second title is correlated with at least one respective clicked uniform resource identifier using a search click log. The initial key term set is expanded to include search terms, in addition to the first titles and the second title, to provide an expanded key term set. The search terms are correlated to the clicked uniform resource identifiers based on the search click log. A search query intent classifier is trained to classify search queries with respect to the designated query intent based on the expanded key term set.

Another example method is described for training a search query intent classifier. In accordance with this example method, a category to which a first wiki article is assigned is determined. The first wiki article is included in an initial key term set. The first wiki article has a first title that is associated with a designated query intent. Second titles of respective second wiki articles that are assigned to the category are extracted to be included in the initial key term set. Each of the first title and the second titles is correlated with at least one respective clicked uniform resource identifier using a search click log. The initial key term set is expanded to include search terms, in addition to the first title and the second titles, to provide an expanded key term set. The search terms are correlated to the clicked uniform resource identifiers based on the search click log. A search query intent classifier is trained to classify search queries with respect to the designated query intent based on the expanded key term set.

An example system is described that includes an extraction module, a correlation module, an expansion module, and a training module. The extraction module is configured to extract first titles of respective first wiki articles to provide an initial key term set that includes the first titles and a second title that is associated with a designated query intent. The first wiki articles correspond to respective links that are associated with a second wiki article that has the second title. The correlation module is configured to correlate each of the first titles and the second title with at least one respective clicked uniform resource identifier using a search click log. The expansion module is configured to expand the initial key term set to include search terms, in addition to the first titles and the second title, to provide an expanded key term set. The search terms are correlated to the clicked uniform resource identifiers based on the search click log. The training module is configured to train a search query intent classifier to classify search queries with respect to the designated query intent based on the expanded key term set.

Another example system is described that includes a category determination module, an extraction module, a correlation module, an expansion module, and a training module. The category determination module is configured to determine a category to which a first wiki article is assigned. The first wiki article is included in an initial key term set. The first wiki article has a first title that is associated with a designated query intent. The extraction module is configured to extract second titles of respective second wiki articles that are assigned to the category to be included in the initial key term set. The correlation module is configured to correlate each of the first title and the second titles with at least one respective clicked uniform resource identifier using a search click log. The expansion module is configured to expand the initial key term set to include search terms, in addition to the first title and the second titles, to provide an expanded key term set. The search terms are correlated to the clicked uniform resource identifiers based on the search click log. The training module is configured to train a search query intent classifier to classify search queries with respect to the designated query intent based on the expanded key term set.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
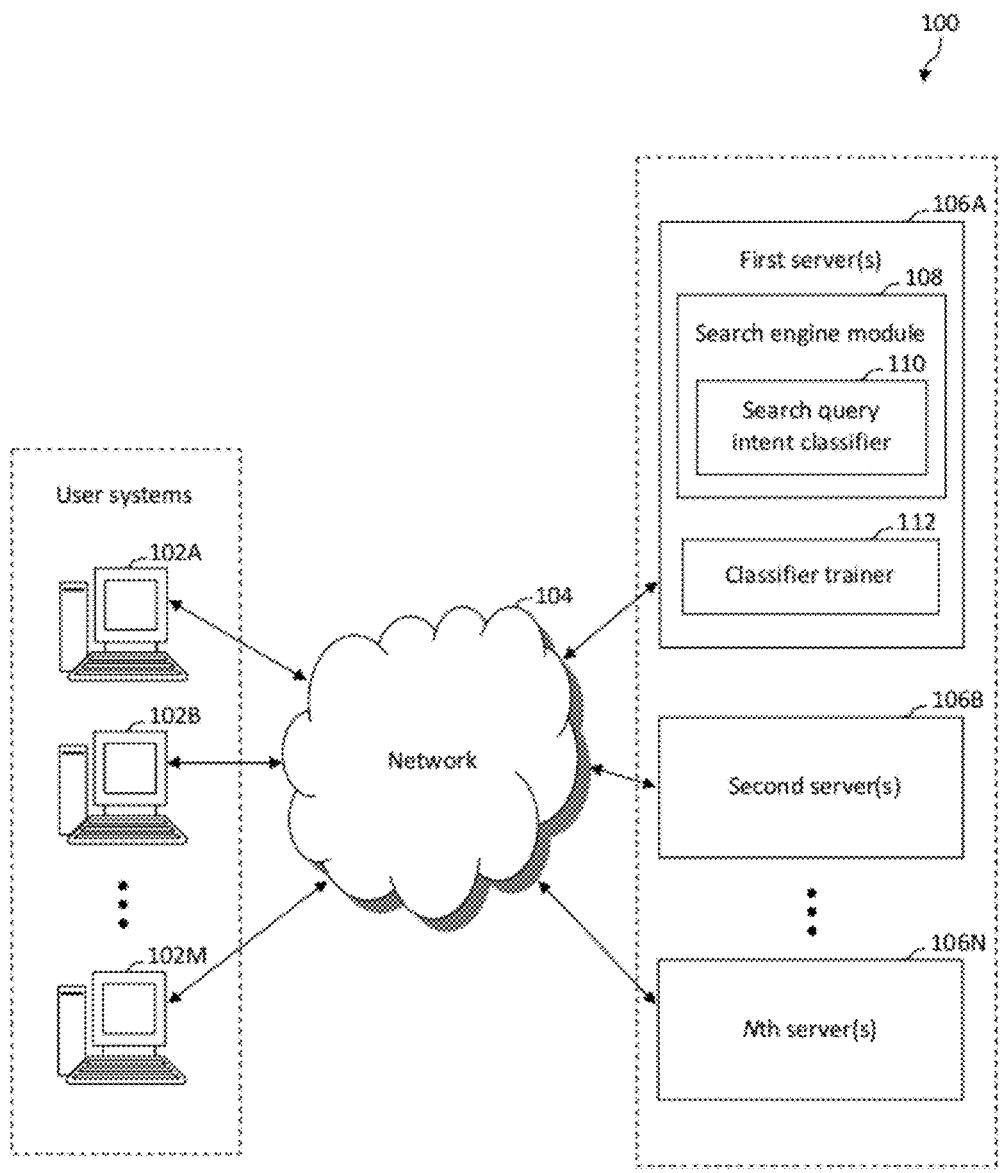
FIG. 1 is a block diagram of an example computer system in accordance with an embodiment described herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments are capable of training a search query intent classifier using wiki article titles and a search click log. A wiki is a site (e.g., a Web site) that provides a platform for the creation and editing of interlinked pages (e.g., Web pages) via a client (e.g., a Web crawler, a Web browser, a non-Web-enabled client, etc.). Examples of a wiki include, but are not limited to, Wikipedia®, Memory Alpha, Wikitravel™, World66™, Flu Wiki™, etc. A wiki may be created and/or edited using a markup language, a what-you-see-is-what-you-get (WYSIWYG) text editor, or other means. Each interlinked page of a wiki is referred to as a wiki article. Each wiki article includes a title and a body. The title identifies the subject matter of the wiki article, and the body provides information (e.g., text, images, video, etc.) regarding the subject matter.

Wiki articles are associated with links (e.g., hyperlinks). For example, a wiki article may be associated with an article link, an in-link, a category link, a redirection link, and/or a disambiguation link. An article link is a link from the wiki article to another wiki article. An in-link is a link to the wiki article from another wiki article. A category link is a link to a category that includes the wiki article. For instance, categories of wiki articles may be organized hierarchically into an ontology. A redirection link is a link to a wiki article that has a title that is deemed to be relevant to a user's search query when no wiki article has a title that matches the user's search query exactly. For example, if a user provides a search query of "Xbox", the user may be redirected to a wiki article having a title of "Xbox 360" if no wiki article has a title of "Xbox". A disambiguation link is a link to one of multiple wiki articles to which a user's search query is deemed to pertain. For instance, if a user provides a search query of "Michael Jackson", the user may be presented with a first disambiguation link that links to a wiki article about the Michael Jackson who is an American recording artist and a second disambiguation link that links to a wiki article about the Michael Jackson who is an English author of books about beer and whiskey.

Documents that are retrieved in response to a user's search query are referred to as a search result. Each of the documents has a respective uniform resource identifier (URI), such as a uniform resource locator (URL) or a uniform resource name (URN), which may be selected (e.g., clicked) by the user to cause the document to be displayed to the user. A search click log is a record of search queries that are provided by users and the documents that are selected by the users from the search results that are retrieved in response to those search queries. Accordingly, a search click log may be used to correlate search terms that are included in the users' search queries to the clicked uniform resource identifiers.

Techniques described herein for training a search query intent classifier using wiki article titles and a search click log have a variety of benefits as compared to conventional classifier training techniques. For example, the techniques described herein may involve substantially less human effort than conventional classifier training techniques. The techniques may be capable discovering a substantial number of keywords and/or key phrases that have specific query intent, even if relatively few seed key terms (e.g., keywords and/or key phrases) are available. The techniques described herein may be applicable to a variety of query intent domains.

II. Example Embodiments

FIG. 1 is a block diagram of an example computer system 100 in accordance with an embodiment. Generally speaking, computer system 100 operates to provide information to users in response to requests (e.g., hypertext transfer protocol (HTTP) requests) that are received from the users. The information may include documents (e.g., Web pages, images, video files, etc.), output of executables, and/or any other suitable type of information. For example, user system 100 may provide search results in response to search queries that are provided by users. In accordance with this example, the search queries may be classified with respect to query intent. According to example embodiments, computer system 100 operates to train a search query intent classifier using wiki article titles and a search click log. Further detail regarding techniques for training a search query intent classifier using wiki article titles and a search click log is provided in the following discussion.

As shown in FIG. 1, computer system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for information using a client (e.g., a Web browser, a Web crawler, a non-Web-enabled client, etc.) deployed on a user system 102 that is owned by or otherwise accessible to the user. In accordance with some example embodiments, user systems 102A-102M are capable of accessing Web sites hosted by servers 104A-104N, so that user systems 102A-102M may access information that is available via the Web sites. Such Web sites include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a laptop computer, a tablet computer, a personal digital assistant, a cellular telephone, or the like.

Servers 106A-106N are processing systems that are capable of communicating with user systems 102A-102M. Servers 106A-106N are configured to execute software programs that provide information to users in response to receiving requests from the users. For example, the information may include documents (e.g., Web pages, images, video files, etc.), output of executables, or any other suitable type of information. In accordance with some example embodiments, servers 106A-106N are configured to host respective Web sites, so that the Web sites are accessible to users of computer system 100.

One type of software program that may be executed by any one or more of servers 106A-106N is a search engine. A search engine is executed by a server to search for information in a networked computer system based on search queries that are provided by users. First server(s) 106A is shown to include search engine module 108 for illustrative purposes. Search engine module 108 is configured to execute a search engine. For instance, search engine module 108 may search among servers 106A-106N for requested information. Upon determining instances of information that are relevant to a user's search query, search engine module 108 provides the instances of the information as a search result to the user. Search engine module 108 may rank the instances based on their relevance to the search query. For instance, search engine module 108 may list the instances in the search result in an order that is based on the respective rankings of the instances.

Search engine module 108 includes a search query intent classifier 110. Search query intent classifier 110 is configured to classify search queries with respect to query intent. For example, search query intent classifier 110 may assign the search queries among predefined classes, with each class representing a respective query intent. Classification of the search queries may enable search engine module 108 to provide more relevant search results and/or contextual advertisements to users who provide the search queries.

First server(s) 106A is shown to further include classifier trainer 112 for illustrative purposes. Classifier trainer 112 is configured to train search query intent classifier 110 using wiki article titles and a search click log. In accordance with example embodiments, classifier trainer 112 is configured to extract titles of wiki articles that correspond to links that are associated with a specified wiki article and/or titles of wiki articles that are included in a category that includes the specified wiki article. The extracted titles and the title of the specified wiki article are included in an initial key term set. Each of the titles in the initial key term set is correlated with at least one respective clicked uniform resource identifier using a search click log. Classifier trainer 112 expands the initial key term set to include search terms (in addition to the aforementioned titles) that are correlated to the clicked uniform resource identifiers based on the search click log to provide an expanded key term set. Classifier trainer 112 trains search query intent classifier 110 to classify search queries with respect to a query intent that is associated with the title of the specified wiki article based on the expanded key term set. Some example techniques for training a search query intent classifier using wiki article titles and a search click log are discussed in greater detail below with reference to FIGS. 2-11.

It will be recognized that classifier trainer 112 may be included in search engine module 108. For example, classifier trainer 112 may be included in search query intent classifier 110.

FIGS. 2-10 depict flowcharts 200, 300, 400, 500, 600, 700, 800, 900, and 1000 of example methods of training a search query intent classifier in accordance with embodiments described herein. Flowcharts 200, 300, 400, 500, 600, 700, 800, 900, and 1000 may be performed by classifier trainer 112 of computer system 100 shown in FIG. 1, for example. For illustrative purposes, flowcharts 200, 300, 400, 500, 600, 700, 800, 900, and 1000 are described with respect to a classifier trainer 1100 shown in FIG. 11, which is an example of a classifier trainer 112, according to an embodiment. As shown in FIG. 11, classifier trainer 1100 includes an extraction module 1102, a correlation module 1104, an expansion module 1106, a training module 1108, a category determination module 1110, a probability module 1112, and a selection module 1114. Further structural and operational embodiments will be apparent to persons skilled in the relevant art(s) based on the discussion regarding flowcharts 200, 300, 400, 500, 600, 700, 800, 900, and 1000.

Figure 2:
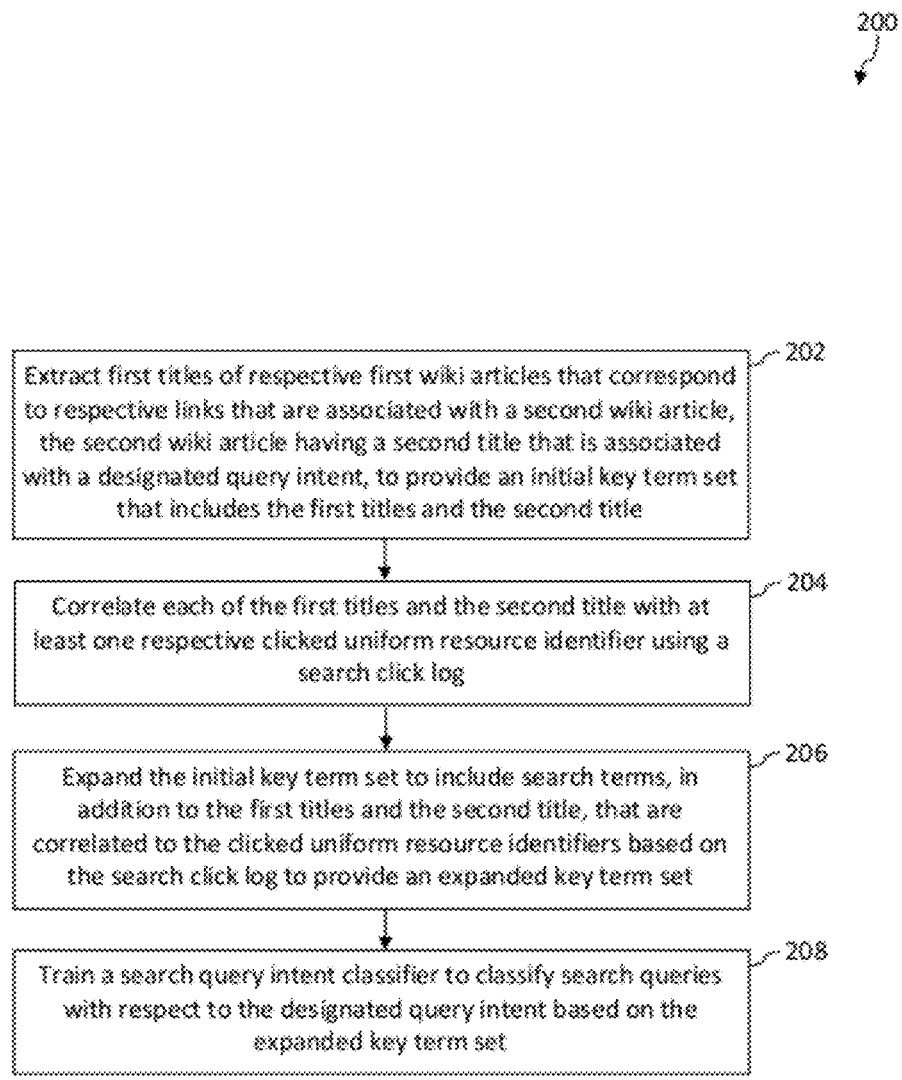
FIGS. 2-10 depict flowcharts of example methods of training a search query intent classifier in accordance with embodiments described herein.

As shown in FIG. 2, the method of flowchart 200 begins at step 202. In step 202, first titles of respective first wiki articles are extracted to provide an initial key term set that includes the first titles and a second title that is associated with a designated query intent. The first wiki articles correspond to respective links that are associated with a second wiki article that has the second title. For example, the links may be article links, category links, redirection links, etc. or any combination thereof. In an example implementation, extraction module 1102 extracts the first titles.

At step 204, each of the first titles and the second title is correlated with at least one respective clicked uniform resource identifier using a search click log. In an example implementation, correlation module 1104 correlates each of the first titles and the second title with at least one respective clicked uniform resource identifier using the search click log.

In an example embodiment, a bipartite graph is generated that correlates each of the first titles and the second title with at least one respective clicked uniform resource identifier using the search click log. For instance, the bipartite graph may specify a frequency for each correlation between a first or second title and a clicked uniform resource identifier. Each frequency represents a frequency with which the corresponding uniform resource identifier is clicked by user(s) when the user(s) provide a search query that corresponds to the respective first or second title with which the uniform resource identifier is correlated. The frequencies may indicate respective probabilities that the respective titles in the initial key term set correspond to the designated query intent.

At step 206, the initial key term set is expanded to include search terms, in addition to the first titles and the second title, to provide an expanded key term set. The search terms are correlated to the clicked uniform resource identifiers based on the search click log. For instance, the search click log may be analyzed to randomly select the search terms that are included in the expanded key term set from a larger collection of search terms that are correlated to the clicked uniform resource identifiers. In an example implementation, expansion module 1106 expands the initial key term set to include the search terms to provide the expanded key term set.

At step 208, a search query intent classifier is trained to classify search queries with respect to the designated query intent based on the expanded key term set. For example, the search query intent classifier may be a maxentropy classifier, though the scope of the example embodiments is not limited in this respect. In some example embodiments, the search query intent classifier is trained further based on text that is included in the second wiki article. In an example implementation, training module 1108 trains the search query intent classifier.

Figure 3:
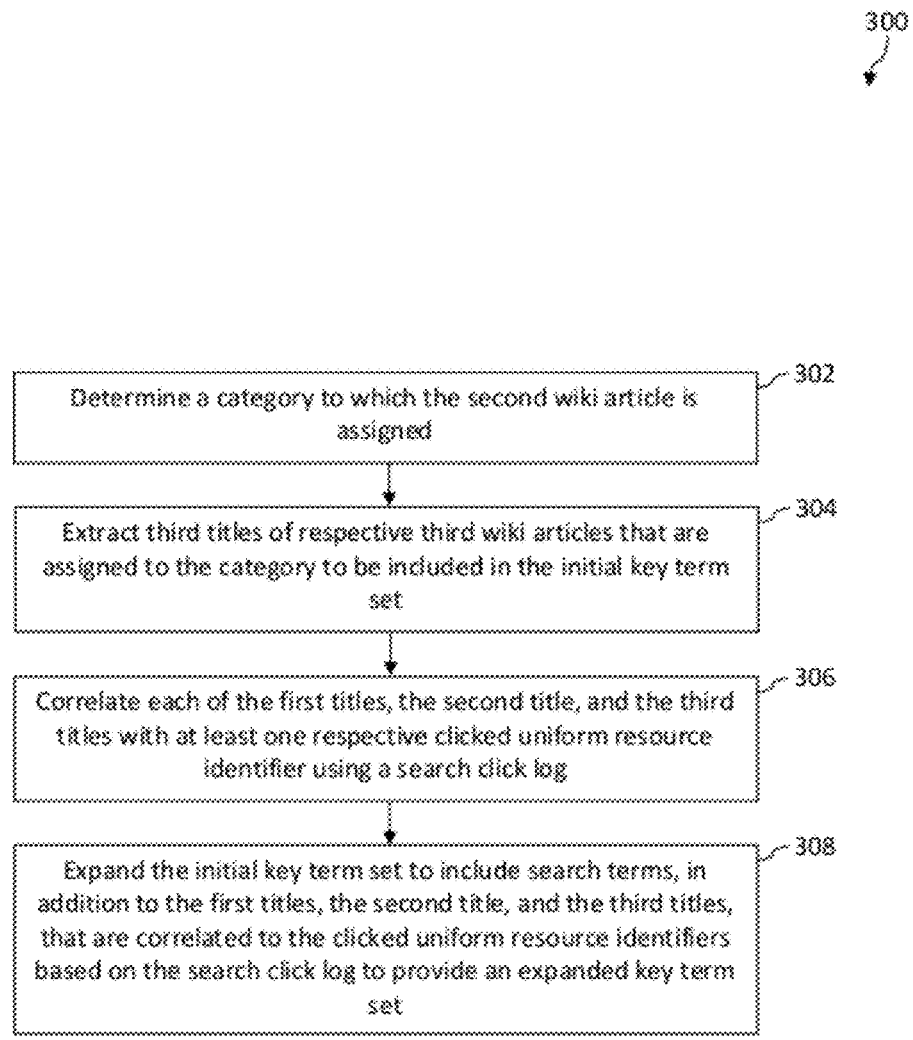

In an example embodiment, instead of performing steps 204 and 206 of flowchart 200, the steps of flowchart 300 in FIG. 3 are performed. As shown in FIG. 3, the method of flowchart 300 begins at step 302. In step 302, a category to which the second wiki article is assigned is determined. For instance, a wiki article regarding "clogs" may be assigned to a "footwear" category and/or a "shoes" category. In an example implementation, category determination module 1110 determines the category to which the second wiki article is assigned.

At step 304, third titles of respective third wiki articles that are assigned to the category are extracted to be included in the initial key term set. In an example implementation, extraction module 1102 extracts the third titles to be included in the initial key term set.

At step 306, each of the first titles, the second title, and the third titles is correlated with at least one respective clicked uniform resource identifier using a search click log. In an example implementation, correlation module 1104 correlates each of the first titles, the second title, and the third titles with at least one respective clicked uniform resource identifier using the search click log.

At step 308, the initial key term set is expanded to include search terms, in addition to the first titles, the second title, and the third titles, to provide an expanded key term set. The search terms are correlated to the clicked uniform resource identifiers based on the search click log. In an example implementation, expansion module 1106 expands the initial key term set to provide the expanded key term set.

Figure 4:
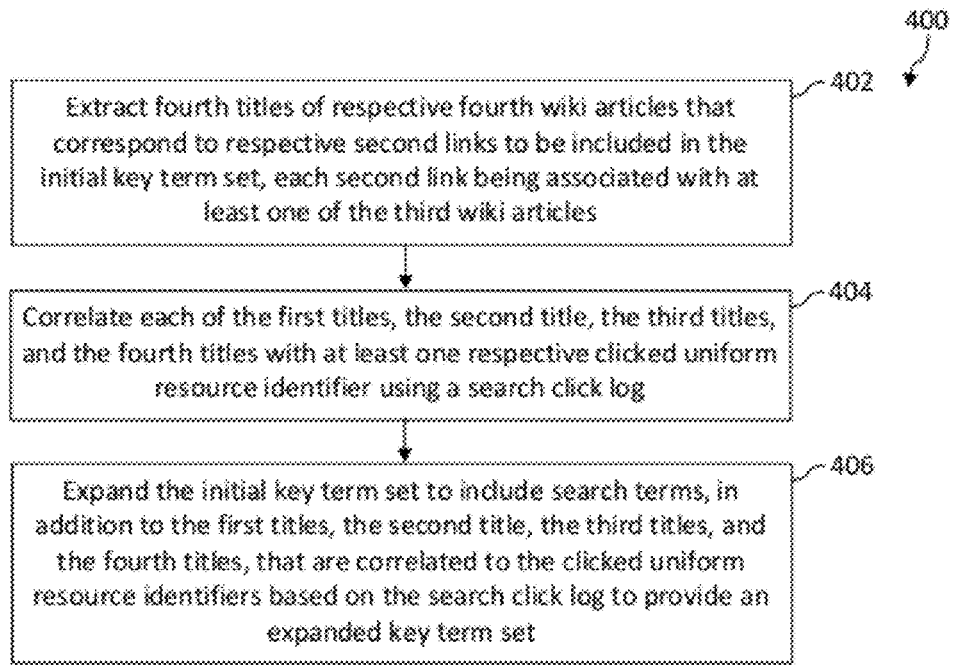

In an example embodiment, instead of performing steps 306 and 308 of flowchart 300, the steps of flowchart 400 in FIG. 4 are performed. As shown in FIG. 4, the method of flowchart 400 begins at step 402. In step 402, fourth titles of respective fourth wiki articles that correspond to respective second links are extracted to be included in the initial key term set. Each second link is associated with at least one of the third wiki articles. In an example implementation, extraction module 1102 extracts the fourth titles to be included in the initial key term set.

At step 404, each of the first titles, the second title, the third titles, and the fourth titles is correlated with at least one respective clicked uniform resource identifier using a search click log. In an example implementation, correlation module 1104 correlates each of the first titles, the second title, the third titles, and the fourth titles with at least one respective clicked uniform resource identifier using the search click log.

At step 406, the initial key term set is expanded to include search terms, in addition to the first titles, the second title, the third titles, and the fourth titles, to provide an expanded key term set. The search terms are correlated to the clicked uniform resource identifiers based on the search click log. In an example implementation, expansion module 1106 expands the initial key term set to provide the expanded key term set.

Figure 5:
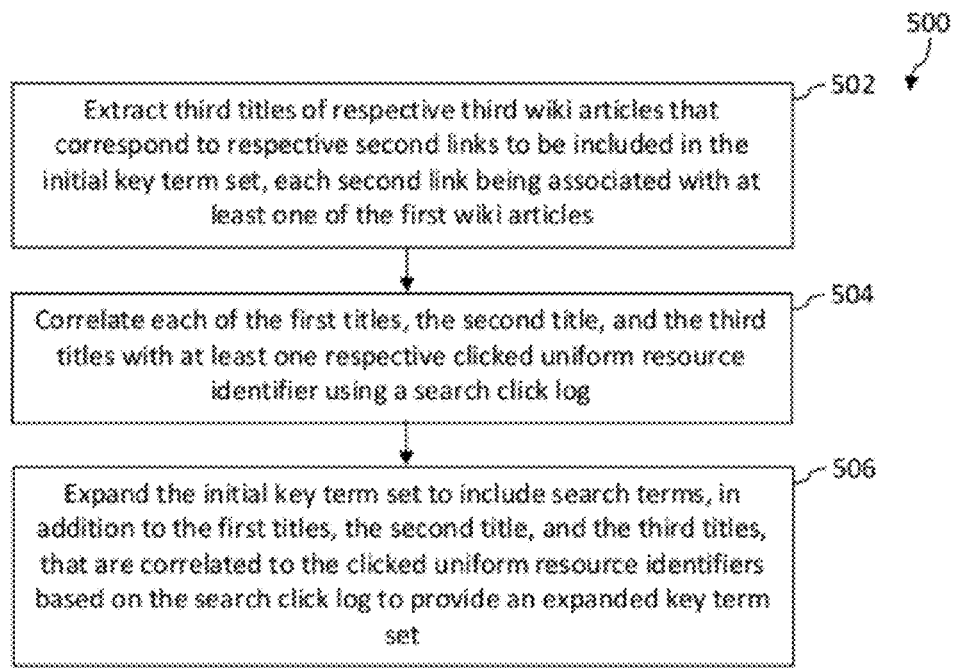

In another example embodiment, instead of performing steps 204 and 206 of flowchart 200, the steps of flowchart 500 in FIG. 5 are performed. As shown in FIG. 5, the method of flowchart 500 begins at step 502. In step 502, third titles of respective third wiki articles that correspond to respective second links are extracted to be included in the initial key term set. Each second link is associated with at least one of the first wiki articles. In an example implementation, extraction module 1102 extracts the third titles to be included in the initial key term set.

At step 504, each of the first titles, the second title, and the third titles is correlated with at least one respective clicked uniform resource identifier using a search click log. In an example implementation, correlation module 1104 correlates each of the first titles, the second title, and the third titles with at least one respective clicked uniform resource identifier using the search click log.

At step 506, the initial key term set is expanded to include search terms, in addition to the first titles, the second title, and the third titles, to provide an expanded key term set. The search terms are correlated to the clicked uniform resource identifiers based on the search click log. In an example implementation, expansion module 1106 expands the initial key term set to provide the expanded key term set.

Figure 6:
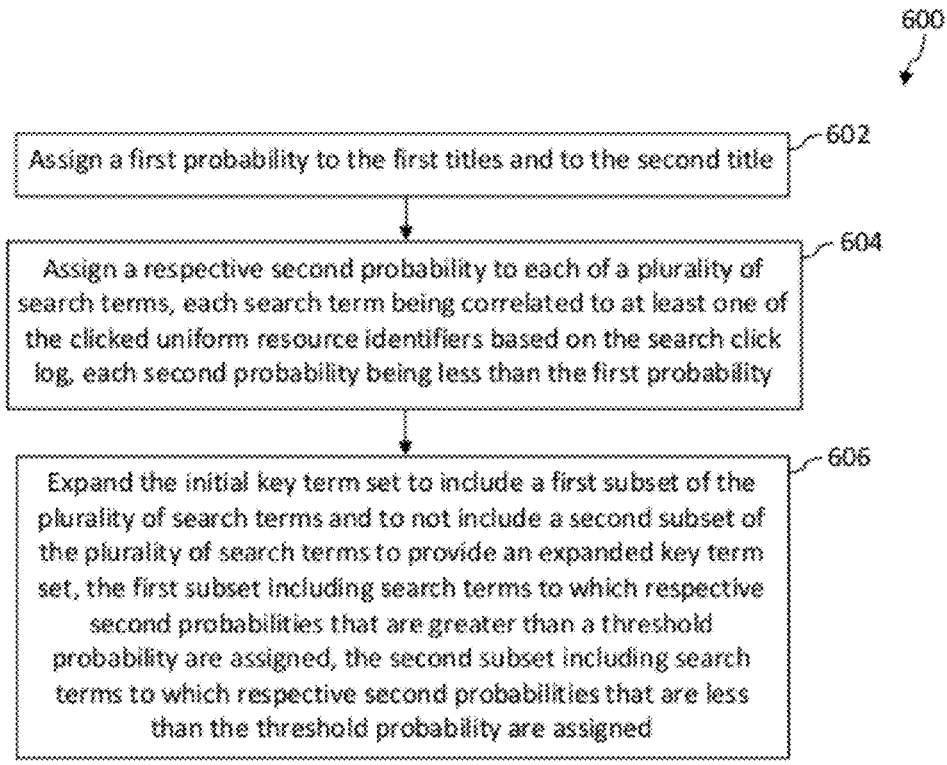

In another example embodiment, instead of performing step 206 of flowchart 200, the steps of flowchart 600 in FIG. 6 are performed. As shown in FIG. 6, the method of flowchart 600 begins at step 602. In step 602, a first probability is assigned to the first titles and to the second title. For example, the first probability may indicate a likelihood that the first titles and the second title are associated with the designated query intent. For instance, the first probability may be substantially 100%. Although the first probability is described in this example as being common among the first titles and the second title, it will be recognized that the probability that is assigned to the first titles need not necessarily be the same as the probability that is assigned to the second title. In an example implementation, probability module 1112 assigns the first probability to the first titles and to the second title.

At step 604, a respective second probability is assigned to each of a plurality of search terms. Each search term is correlated to at least one of the clicked uniform resource identifiers based on the search click log. Each second probability is less than the first probability. For example, each second probability may indicate a likelihood that the search term to which that second probability is assigned is associated with the designated query intent. In an example implementation, probability module 1112 assigns the second probabilities to the respective search terms.

At step 606, the initial key term set is expanded to include a first subset of the plurality of search terms and to not include a second subset of the plurality of search terms to provide an expanded key term set. The first subset includes search terms to which respective second probabilities that are greater than a threshold probability are assigned. The second subset includes search terms to which respective second probabilities that are less than the threshold probability are assigned. In an example implementation, expansion module 1106 expands the initial key term set to provide the expanded key term set.

Figure 7:
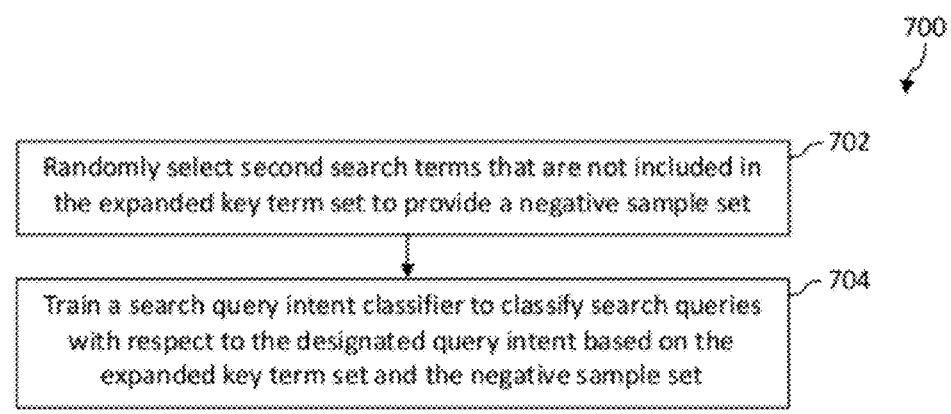

In another example embodiment, instead of performing step 208 of flowchart 200, the steps of flowchart 700 in FIG. 7 are performed. As shown in FIG. 7, the method of flowchart 700 begins at step 702. In step 702, second search terms that are not included in the expanded key term set are randomly selected to provide a negative sample set. In an example implementation, selection module 1114 randomly selects the second search terms to provide the negative sample set.

At step 704, a search query intent classifier is trained to classify search queries with respect to the designated query intent based on the expanded key term set and the negative sample set. In an example implementation, training module 1108 trains the search query intent classifier to classify the search queries with respect to the designated query intent based on the expanded key term set and the negative sample set.

Figure 8:
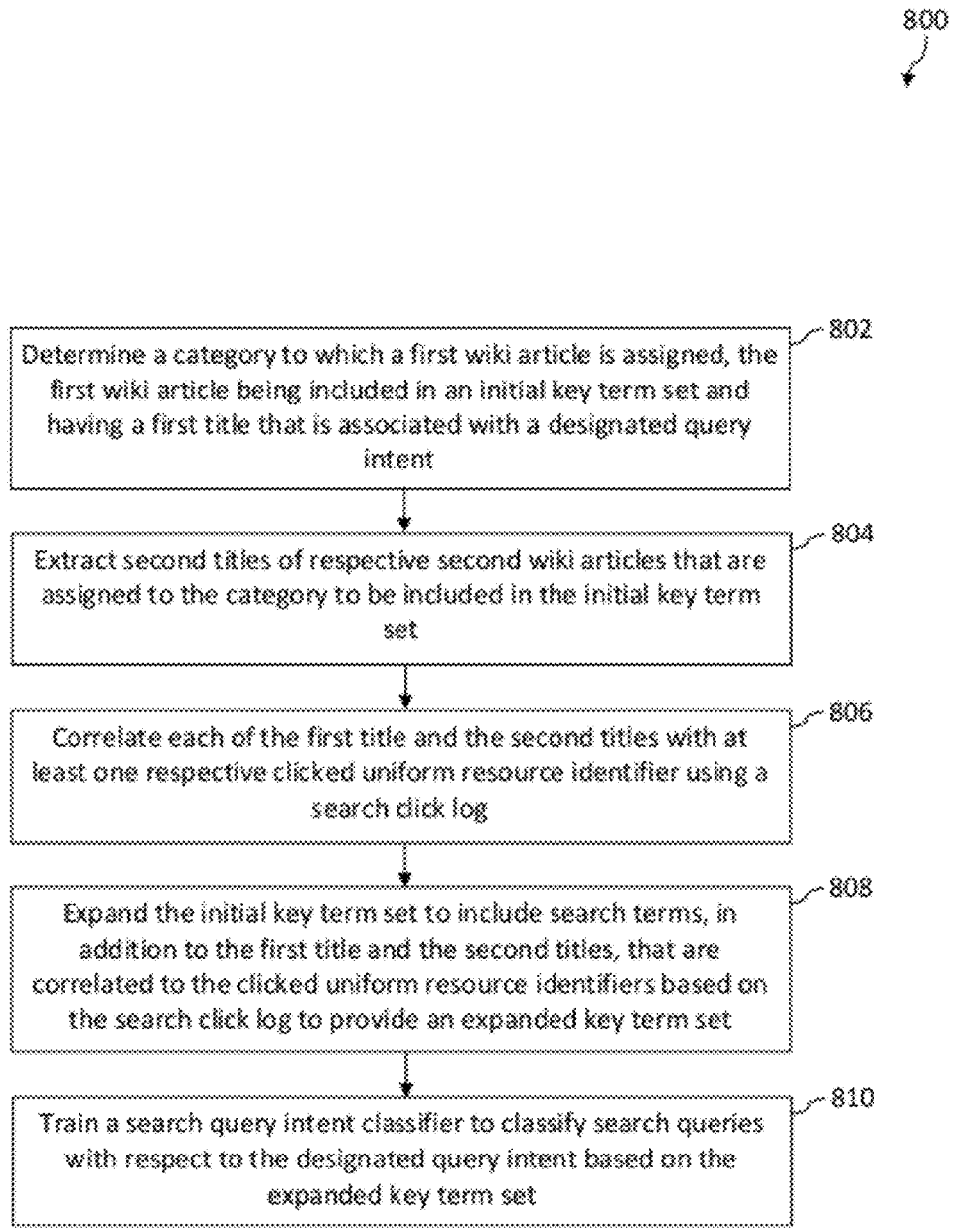

As shown in FIG. 8, the method of flowchart 800 begins at step 802. In step 802, a category to which a first wiki article is assigned is determined. The first wiki article is included in an initial key term set. The first wiki article has a first title that is associated with a designated query intent. In an example implementation, category determination module 1110 determines the category to which the first wiki article is assigned.

At step 804, second titles of respective second wiki articles that are assigned to the category are extracted to be included in the initial key term set. In an example implementation, extraction module 1102 extracts the second titles to be included in the initial key term set.

At step 806, each of the first title and the second titles is correlated with at least one respective clicked uniform resource identifier using a search click log. For example, a bipartite graph may be generated that correlates each of the first title and the second titles with at least one respective clicked uniform resource identifier using the search click log. In an example implementation, correlation module 1104 correlates each of the first title and the second titles with at least one respective clicked uniform resource identifier using the search click log.

At step 808, the initial key term set is expanded to include search terms, in addition to the first title and the second titles, to provide an expanded key term set. The search terms are correlated to the clicked uniform resource identifiers based on the search click log. In an example implementation, expansion module 1106 expands the initial key term set to provide the expanded key term set.

At step 810, a search query intent classifier is trained to classify search queries with respect to the designated query intent based on the expanded key term set. In an example implementation, training module 1108 trains the search query intent classifier to classify the search queries with respect to the designated query intent based on the expanded key term set.

Figure 9:
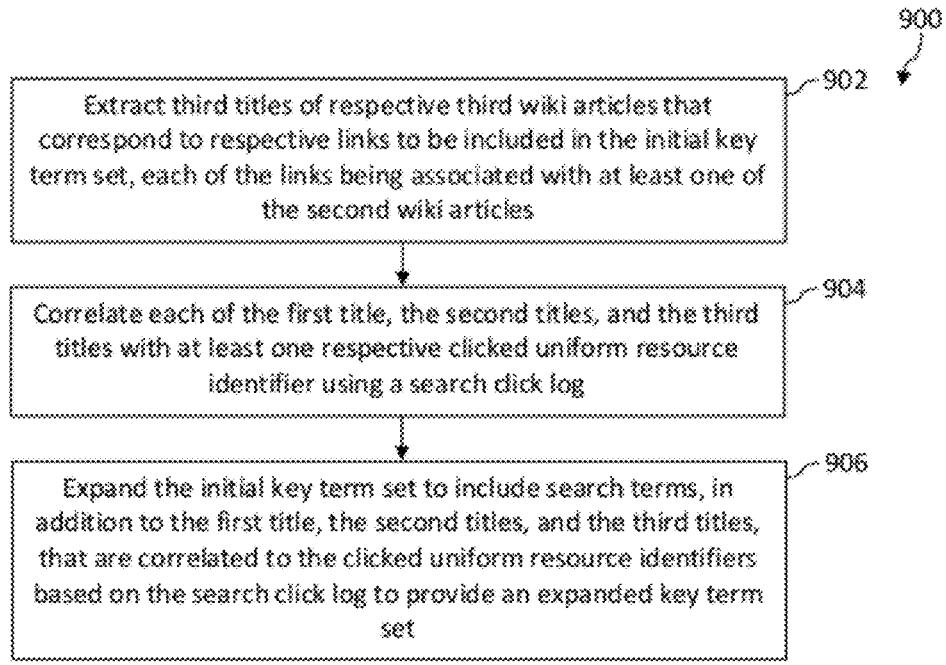

In another example embodiment, instead of performing steps 806 and 808 of flowchart 800, the steps of flowchart 900 in FIG. 9 are performed. As shown in FIG. 9, the method of flowchart 900 begins at step 902. In step 902, third titles of respective third wiki articles that correspond to respective links are extracted to be included in the initial key term set. Each of the links is associated with at least one of the second wiki articles. In an example implementation, extraction module 1102 extracts the third titles to be included in the initial key term set.

At step 904, each of the first title, the second titles, and the third titles is correlated with at least one respective clicked uniform resource identifier using a search click log. In an example implementation, correlation module 1104 correlates each of the first title, the second titles, and the third titles with at least one respective clicked uniform resource identifier using the search click log.

At step 906, the initial key term set is expanded to include search terms, in addition to the first title, the second titles, and the third titles, to provide an expanded key term set. The search terms are correlated to the clicked uniform resource identifiers based on the search click log. In an example implementation, expansion module 1106 expands the initial key term set to provide the expanded key term set.

Figure 10:
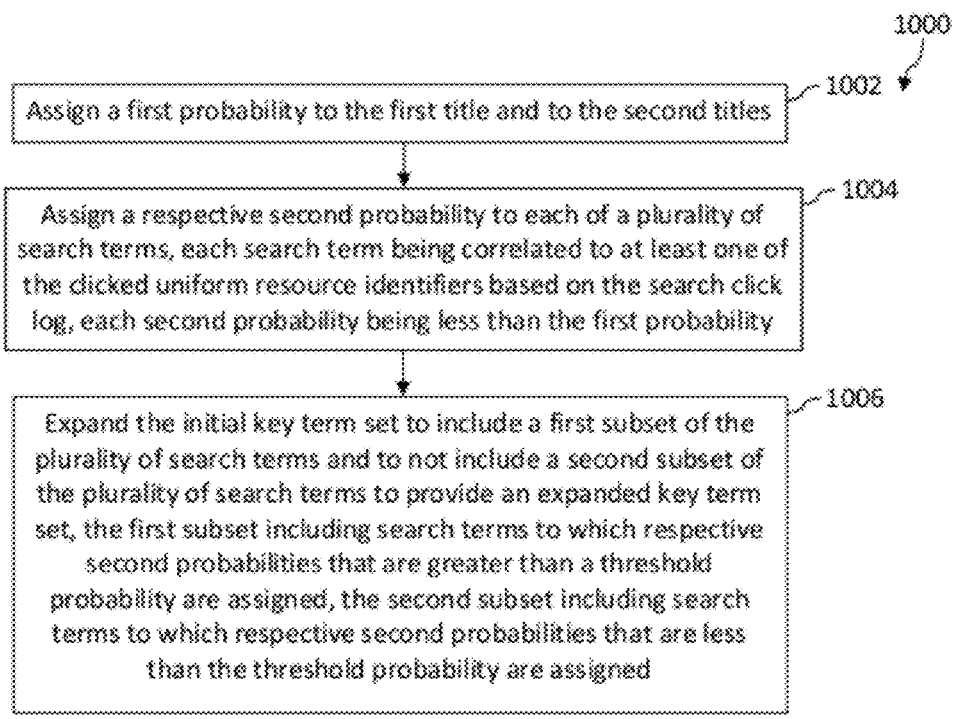
Figure 11:
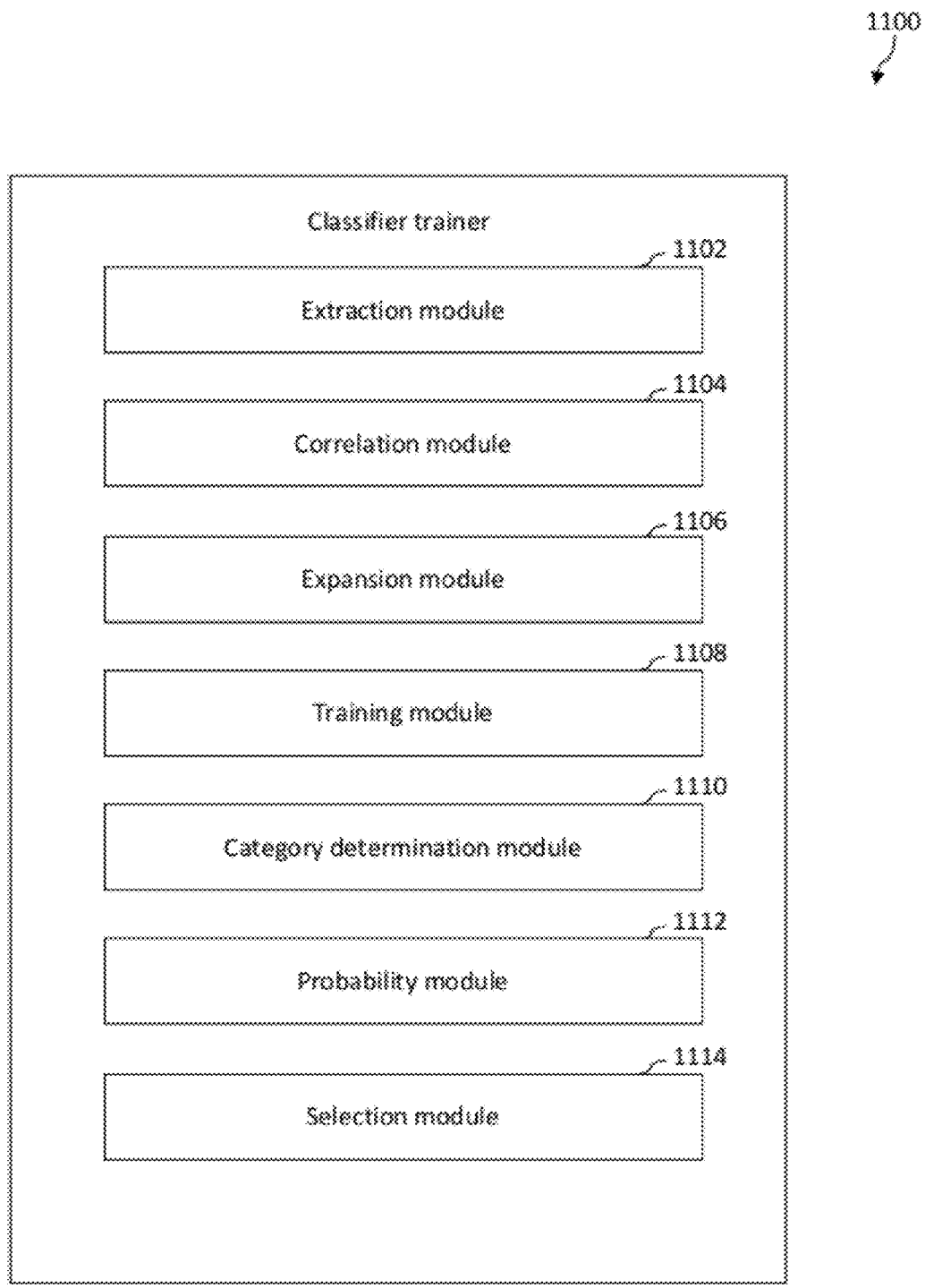
FIG. 11 is a block diagram of an example implementation of a classifier trainer shown in FIG. 1 in accordance with an embodiment described herein.

In another example embodiment, instead of performing step 808 of flowchart 800, the steps of flowchart 1000 in FIG. 10 are performed. As shown in FIG. 10, the method of flowchart 1000 begins at step 1002. In step 1002, a first probability is assigned to the first title and to the second titles. For example, the first probability may indicate a likelihood that the first title and the second titles are associated with the designated query intent. For instance, the first probability may be substantially 100%. Although the first probability is described in this example as being common among the first title and the second titles, it will be recognized that the probability that is assigned to the first title need not necessarily be the same as the probability that is assigned to the second titles. In an example implementation, probability module 1112 assigns the first probability to the first title and to the second titles.

At step 1004, a respective second probability is assigned to each of a plurality of search terms. Each search term is correlated to at least one of the clicked uniform resource identifiers based on the search click log. Each second probability is less than the first probability. For example, each second probability may indicate a likelihood that the search term to which that second probability is assigned is associated with the designated query intent. In an example implementation, probability module 1112 assigns the second probabilities to the respective search terms.

At step 1006, the initial key term set is expanded to include a first subset of the plurality of search terms and to not include a second subset of the plurality of search terms to provide an expanded key term set. The first subset includes search terms to which respective second probabilities that are greater than a threshold probability are assigned. The second subset includes search terms to which respective second probabilities that are less than the threshold probability are assigned. In an example implementation, expansion module 1106 expands the initial key term set to provide the expanded key term set.

It will be recognized that classifier trainer 1100 may not include one or more of extraction module 1102, correlation module 1104, expansion module 1106, training module 1108, category determination module 1110, probability module 1112, and/or selection module 1114. Furthermore, classifier trainer 1100 may include modules in addition to or in lieu of extraction module 1102, correlation module 1104, expansion module 1106, training module 1108, category determination module 1110, probability module 1112, and/or selection module 1114. For instance, classifier trainer 1100 may include search engine module 108 and/or search query intent classifier 110 of FIG. 1.

III. Other Example Embodiments

Search engine module 108, search query intent classifier 110, classifier trainer 112, extraction module 1102, correlation module 1104, expansion module 1106, training module 1108, category determination module 1110, probability module 1112, and selection module 1114 may be implemented in hardware, software, firmware, or any combination thereof. For example, search engine module 108, search query intent classifier 110, classifier trainer 112, extraction module 1102, correlation module 1104, expansion module 1106, training module 1108, category determination module 1110, probability module 1112, and/or selection module 1114 may be implemented as computer program code configured to be executed in one or more processors. In another example, search engine module 108, search query intent classifier 110, classifier trainer 112, extraction module 1102, correlation module 1104, expansion module 1106, training module 1108, category determination module 1110, probability module 1112, and/or selection module 1114 may be implemented as hardware logic/electrical circuitry.

IV. Example Computer Implementation

Figure 12:
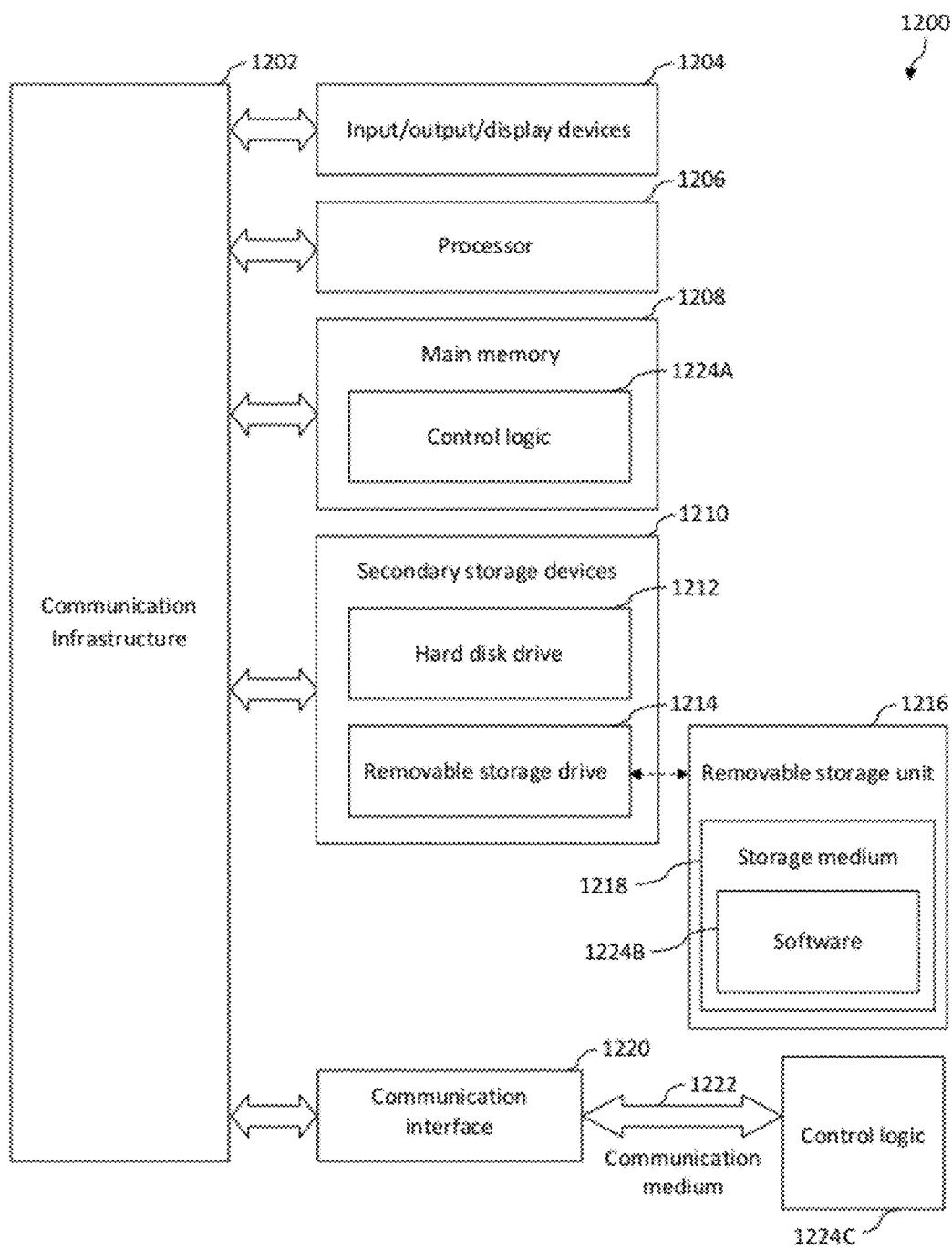
FIG. 12 is a block diagram of a computer in which embodiments may be implemented.

The embodiments described herein, including systems, methods/processes, and/or apparatuses, may be implemented using well known servers/computers, such as computer 1200 shown in FIG. 12. For example, elements of example computer system 100, including any of the user systems 102A-102M and any of the servers 106A-106N depicted in FIG. 1 and elements thereof (including search engine module 108 and search query intent classifier 110 depicted in FIG. 1 and classifier 112 depicted in FIGS. 1 and 11 and elements thereof), and each of the steps of flowcharts 200, 300, 400, 500, 600, 700, 800, 900, and 1000 depicted in respective FIGS. 2-10 can each be implemented using one or more computers 1200.

Computer 1200 can be any commercially available and well known computer capable of performing the functions described herein, such as computers available from International Business Machines, Apple, Sun, HP, Dell, Cray, etc. Computer 1200 may be any type of computer, including a desktop computer, a server, etc.

As shown in FIG. 12, computer 1200 includes one or more processors (e.g., central processing units (CPUs)), such as processor 1206. Processor 1206 may include search engine module 108, search query intent classifier 110, and/or classifier trainer 112 of FIG. 1; extraction module 1102, correlation module 1104, expansion module 1106, training module 1108, category determination module 1110, probability module 1112, and/or selection module 1114 of FIG. 11; or any portion or combination thereof, for example, though the scope of the embodiments is not limited in this respect. Processor 1206 is connected to a communication infrastructure 1202, such as a communication bus. In some embodiments, processor 1206 can simultaneously operate multiple computing threads.

Computer 1200 also includes a primary or main memory 1208, such as a random access memory (RAM). Main memory has stored therein control logic 1224A (computer software), and data.

Computer 1200 also includes one or more secondary storage devices 1210. Secondary storage devices 1210 include, for example, a hard disk drive 1212 and/or a removable storage device or drive 1214, as well as other types of storage devices, such as memory cards and memory sticks. For instance, computer 1200 may include an industry standard interface, such as a universal serial bus (USB) interface for interfacing with devices such as a memory stick. Removable storage drive 1214 represents a floppy disk drive, a magnetic tape drive, a compact disk drive, an optical storage device, tape backup, etc.

Removable storage drive 1214 interacts with a removable storage unit 1216. Removable storage unit 1216 includes a computer useable or readable storage medium 1218 having stored therein computer software 1224B (control logic) and/or data. Removable storage unit 1216 represents a floppy disk, magnetic tape, compact disc (CD), digital versatile disc (DVD), Blue-ray disc, optical storage disk, memory stick, memory card, or any other computer data storage device. Removable storage drive 1214 reads from and/or writes to removable storage unit 1216 in a well known manner.

Computer 1200 also includes input/output/display devices 1204, such as monitors, keyboards, pointing devices, etc.

Computer 1200 further includes a communication or network interface 1220. Communication interface 1220 enables computer 1200 to communicate with remote devices. For example, communication interface 1220 allows computer 1200 to communicate over communication networks or mediums 1222 (representing a form of a computer useable or readable medium), such as local area networks (LANs), wide area networks (WANs), the Internet, etc. Network interface 1220 may interface with remote sites or networks via wired or wireless connections. Examples of communication interface 1222 include but are not limited to a modem, a network interface card (e.g., an Ethernet card), a communication port, a Personal Computer Memory Card International Association (PCMCIA) card, etc.

Control logic 1224C may be transmitted to and from computer 1200 via the communication medium 1222.

Any apparatus or manufacture comprising a computer useable or readable medium having control logic (software) stored therein is referred to herein as a computer program product or program storage device. This includes, but is not limited to, computer 1200, main memory 1208, secondary storage devices 1210, and removable storage unit 1216. Such computer program products, having control logic stored therein that, when executed by one or more data processing devices, cause such data processing devices to operate as described herein, represent embodiments of the invention.

For example, each of the elements of example servers 106A-106N, including search engine module 108, search query intent classifier 110, and classifier trainer 112, each depicted in FIG. 1; extraction module 1102, correlation module 1104, expansion module 1106, training module 1108, category determination module 1110, probability module 1112, and selection module 1114, each depicted in FIG. 11; and each of the steps of flowcharts 200, 300, 400, 500, 600, 700, 800, 900, and 1000 depicted in respective FIGS. 2-10 can be implemented as control logic that may be stored on a computer useable medium or computer readable medium, which can be executed by one or more processors to operate as described herein.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
   obtaining a designated query intent from a search query;
   in response to obtaining the designated query intent from the search query, obtaining a second wiki article corresponding to the designated query intent, wherein the second wiki article includes a second title, a second body, and a plurality of respective links;
   obtaining a plurality of first wiki articles that correspond to the plurality of respective links included in the second wiki article, wherein each of the first wiki articles includes a different title and a different body;
   extracting a plurality of first titles of the plurality of first wiki articles;
   extracting the second title of the second wiki article;
   generating an initial key term set including the plurality of first titles and the second title;
   correlating each of the plurality of first titles and the second title with at least one respective clicked uniform resource identifier based on a search click log, wherein the search click log comprises a record of historical search queries provided by users and documents clicked by the users from search results retrieved in response to the historical search queries, and wherein each of the documents has a respective uniform resource identifier;
   generating an expanded key term set to include the initial key term set expanded to further include search terms correlated to the at least one respective clicked uniform resource identifier;
   training a search query intent classifier to classify search queries with respect to the designated query intent based on the expanded key term set;
   obtaining the designated query intent from a subsequent search query; and
   in response to obtaining the subsequent search query corresponding to the designated query intent, controlling the trained search query intent classifier to select advertisement data based on the expanded key term set.

2. The method of claim 1, further comprising:
   determining a category to which the second wiki article is assigned; and
   extracting a plurality of third titles of a plurality of respective third wiki articles that are assigned to the category to be included in the initial key term set;
   wherein correlating each of the plurality of first titles and the second title with at least one respective clicked uniform resource identifier comprises:
     correlating each of the plurality of first titles, the second title, and the plurality of third titles with at least one respective clicked uniform resource identifier based on the search click log; and
   wherein generating the expanded key term set comprises:
     expanding the initial key term set to include search terms, in addition to the plurality of first titles, the second title, and the plurality of third titles, that are correlated to the at least one respective clicked uniform resource identifier based on the search click log to provide the expanded key term set.

3. The method of claim 2, further comprising:
   extracting a plurality of fourth titles of a plurality of respective fourth wiki articles that corresponds to a plurality of respective second links to be included in the initial key term set, each of the plurality of second links being associated with at least one of the plurality of third wiki articles;
   wherein correlating each of the plurality of first titles and the second title with at least one respective clicked uniform resource identifier comprises:

correlating each of the plurality of first titles, the second title, the plurality of third titles, and the plurality of fourth titles with at least one respective clicked uniform resource identifier based on the search click log; and wherein generating the expanded key term set comprises:
expanding the initial key term set to include search terms, in addition to the plurality of first titles, the second title, the plurality of third titles, and the plurality of fourth titles, that are correlated to the at least one respective clicked uniform resource identifier based on the search click log to provide the expanded key term set.

4. The method of claim 1, further comprising:
extracting a plurality of third titles of a plurality of respective third wiki articles that corresponds to a plurality of respective second links to be included in the initial key term set, each of the plurality of second links being associated with at least one of the plurality of first wiki articles;
wherein correlating each of the plurality of first titles and the second title with at least one respective clicked uniform resource identifier comprises:
correlating each of the plurality of first titles, the second title, and the plurality of third titles with at least one respective clicked uniform resource identifier based on the search click log; and
wherein generating the expanded key term set comprises:
expanding the initial key term set to include search terms, in addition to the plurality of first titles, the second title, and the plurality of third titles, that are correlated to the at least one respective clicked uniform resource identifier based on the search click log to provide the expanded key term set.

5. The method of claim 1, wherein correlating each of the plurality of first titles and the second title with at least one respective clicked uniform resource identifier using a search click log comprises:
generating a bipartite graph that correlates each of the plurality of first titles and the second title to the at least one respective clicked uniform resource identifier based on the search click log.

6. The method of claim 1, further comprising:
assigning a first probability to the plurality of first titles and to the second title; and
assigning a respective second probability to each of the search terms, each second probability being less than the first probability,
wherein generating the expanded key term set comprises:
expanding the initial key term set to include a first subset of the search terms and to not include a second subset of the search terms to provide the expanded key term set, the first subset including search terms to which respective second probabilities that are greater than a threshold probability are assigned, the second subset including search terms to which respective second probabilities that are less than the threshold probability are assigned.

7. The method of claim 1, further comprising:
randomly selecting second search terms that are not included in the expanded key term set to provide a negative sample set,
wherein training the search query intent classifier comprises:
training the search query intent classifier to classify the search queries with respect to the designated query intent based on the expanded key term set and the negative sample set.

8. The method of claim 1, wherein training the search query intent classifier comprises:
training a maxentropy classifier to classify the search queries with respect to the designated query intent based on the expanded key term set.

9. The method of claim 1, wherein training the search query intent classifier comprises:
training the search query intent classifier to classify the search queries with respect to the designated query intent based on the expanded key term set and further based on text that is included in the second wiki article.

10. The method of claim 1, wherein extracting the plurality of first titles comprises:
extracting the plurality of first titles of the plurality of respective first wiki articles that corresponds to a plurality of respective article links that are associated with the second wiki article to provide the initial key term set.

11. The method of claim 1, wherein extracting the plurality of first titles comprises:
extracting the plurality of first titles of the plurality of respective first wiki articles that corresponds to a plurality of respective category links that are associated with the second wiki article to provide the initial key term set.

12. The method of claim 1, wherein extracting the plurality of first titles comprises:
extracting the plurality of first titles of the plurality of respective first wiki articles that corresponds to a plurality of respective redirection links that are associated with the second wiki article to provide the initial key term set.

13. A method comprising:
determining a category to which a first wiki article is assigned, the first wiki article including a first title associated with a designated query intent and a first body, wherein the first wiki article is included in an initial key term set;
retrieving a plurality of second wiki articles that are assigned to the category;
extracting a plurality of second titles of the plurality of respective second wiki articles, wherein each of the second wiki articles includes a different title and a different body, and wherein the initial key term set includes the first title and the plurality of second titles;
correlating each of the first title and the plurality of second titles with at least one respective clicked uniform resource identifier based on a search click log, wherein the search click log comprises a record of historical search queries provided by users and documents clicked by the users from search results retrieved in response to the search queries, and wherein each of the documents has a respective uniform resource identifier;
generating an expanded key term set to include the initial key term set expanded to further include search terms correlated to the at least one respective clicked uniform resource identifier;
training a search query intent classifier to classify search queries with respect to the designated query intent based on the expanded key term set;
obtaining the designated query intent from a subsequent search query; and in response to obtaining the subsequent search query corresponding to the designated query intent, controlling the trained search query intent classifier to select advertisement data based on the expanded key term set.

14. The method of claim 13, further comprising:
extracting a plurality of third titles of a plurality of respective third wiki articles that correspond to a plurality of respective links to be included in the initial key term set, each of the plurality of links being associated with at least one of the plurality of second wiki articles;
wherein correlating each of the first title and the plurality of second titles with at least one respective clicked uniform resource identifier comprises:
correlating each of the first title, the plurality of second titles, and the plurality of third titles with at least one respective clicked uniform resource identifier based on the search click log; and
wherein generating the expanded key term set comprises:
expanding the initial key term set to include search terms, in addition to the first title, the plurality of second titles, and the plurality of third titles, that are correlated to the at least one respective clicked uniform resource identifier based on the search click log to provide the expanded key term set.

15. The method of claim 13, wherein correlating each of the first title and the plurality of second titles with at least one respective clicked uniform resource identifier using a search click log comprises:
generating a bipartite graph that correlates each of the first title and the plurality of second titles to the at least one respective clicked uniform resource identifier based on the search click log.

16. The method of claim 13, further comprising:
assigning a first probability to the first title and to the plurality of second titles; and
assigning a respective second probability to each of the search terms, each second probability being less than the first probability,
wherein generating the expanded key term set comprises:
expanding the initial key term set to include a first subset of the search terms and to not include a second subset of the search terms to provide the expanded key term set, the first subset including search terms to which respective second probabilities that are greater than a threshold probability are assigned, the second subset including search terms to which respective second probabilities that are less than the threshold probability are assigned.

17. The method of claim 13, further comprising:
randomly selecting second search terms that are not included in the expanded key term set to provide a negative sample set,
wherein training the search query intent classifier comprises:
training the search query intent classifier to classify the search queries with respect to the designated query intent based on the expanded key term set and the negative sample set.

18. The method of claim 13, wherein training the search query intent classifier comprises: training a maxentropy classifier to classify the search queries with respect to the designated query intent based on the expanded key term set.

19. The method of claim 13, wherein training the search query intent classifier comprises:
training the search query intent classifier to classify the search queries with respect to the designated query intent based on the expanded key term set and further based on text that is included in the first wiki article.

20. A system comprising:
a processor coupled to memory and configured to obtain a designated query intent from a search query;
wherein the processor is configured to control an extraction module to:
in response to obtaining the designated query intent from the search query, obtain a second wiki article corresponding to the designated query intent, wherein the second wiki article includes a second title, a second body, and a plurality of respective links;
obtain a plurality of first wiki articles that correspond to the plurality of respective links included in the second wiki article;
configured to extract a plurality of first titles of the plurality of respective first wiki articles and a second title of the second wiki article, wherein each of the first wiki articles has a different title and a different body; and
generate an initial key term including the plurality of first titles and the second title;
wherein the processor is configured to control a correlation module to correlate each of the plurality of first titles and the second title with at least one respective clicked uniform resource identifier using a search click log, wherein the search click log comprises a record of historical search queries provided by users and documents clicked by the users from search results retrieved in response to the historical search queries, and wherein each of the documents has a respective uniform resource identifier;
wherein the processor is configured to further control the expansion module to generate an expanded key term set to include the initial key term set expanded to include search terms correlated to the at least one respective clicked uniform resource identifier;
wherein the processor is configured to control a training module to:
train a search query intent classifier to classify search queries with respect to the designated query intent based on the expanded key term set; and
control the trained search query intent classifier to select advertisement data based on the expanded key term set for a subsequent search query determined to correspond to the designated query intent.

21. A system comprising:
a determination module configured to determine a category to which a first wiki article is assigned, the first wiki article including a first title associated with a designated query intent and a first body, wherein the first wiki article is included in an initial key term set;
an extraction module configured to:
retrieve a plurality of second wiki articles that are assigned to the category,
extract a plurality of second titles of the plurality of respective second wiki articles, and
obtain an initial key term set including the first title and the plurality of second titles wherein each of the second wiki articles includes a different title and a different body, and wherein the initial key term set includes the first title and the plurality of second titles;
a correlation module configured to correlate each of the first title and the plurality of second titles with at least one respective clicked uniform resource identifier based on a search click log, wherein the search click log comprises a record of historical search queries provided by users and documents clicked by the users from search results retrieved in response to the historical search queries, and wherein each of the documents has a respective uniform resource identifier;

an expansion module configured to generate an expanded key term set to include the initial key term set expanded to further include search terms correlated to the at least one respective clicked uniform resource identifier;

a training module configured to:
   train a search query intent classifier to classify search queries with respect to the designated query intent based on the expanded key term set; and
   control the trained search query intent classifier to select advertisement data based on the expanded key term set for a subsequent search query determined to correspond to the designated query intent.

* * * * *